United States Patent
Chen et al.

(10) Patent No.: US 7,194,112 B2
(45) Date of Patent: Mar. 20, 2007

(54) THREE DIMENSIONAL SPATIAL PANORAMA FORMATION WITH A RANGE IMAGING SYSTEM

(75) Inventors: Shoupu Chen, Rochester, NY (US); Nathan D. Cahill, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 652 days.

(21) Appl. No.: 09/803,802

(22) Filed: Mar. 12, 2001

(65) Prior Publication Data

US 2002/0154812 A1 Oct. 24, 2002

(51) Int. Cl.
*G06K 9/00* (2006.01)

(52) U.S. Cl. ............... 382/106; 382/154; 382/284; 382/285; 382/294; 356/12; 359/462; 396/324; 348/42; 348/50

(58) Field of Classification Search ............ 382/106, 382/154, 284, 285, 294; 356/12; 359/462; 396/324; 348/42, 50
See application file for complete search history.

(56) References Cited

U.S. PATENT DOCUMENTS

| | | | |
|---|---|---|---|
| 4,935,616 A | 6/1990 | Scott | 250/213 |
| 5,796,386 A * | 8/1998 | Lipscomb et al. | 345/156 |
| 6,011,558 A * | 1/2000 | Hsieh et al. | 345/629 |
| 6,023,588 A | 2/2000 | Ray et al. | 396/20 |
| 6,044,181 A * | 3/2000 | Szeliski et al. | 382/284 |
| 6,118,946 A | 9/2000 | Ray et al. | 396/89 |
| 6,456,793 B1 * | 9/2002 | Ray et al. | 396/89 |
| 6,542,249 B1 * | 4/2003 | Kofman et al. | 356/601 |
| 6,754,370 B1 * | 6/2004 | Hall-Holt et al. | 382/106 |

OTHER PUBLICATIONS

Chen et al., "A Practical Approach to Creating Environment Maps and Using Digital Images", 2002 International Conference on Image Processing, Jun. 24-28, 2002, vol. 3, pp. 869-872 (IEEE).*
R.T. Whitaker et al.—"Indoor Scene Reconstruction from Sets of Noisy Range Images"—Jan. 1999.*
U.S. Appl. No. 09/383,573, filed Mar. 12, 2001, Nathan D. Cahill et al.
U.S. Appl. No. 09/449,101, filed Nov. 24, 1999, Nathan D. Cahill et al.

(Continued)

*Primary Examiner*—Jingge Wu
*Assistant Examiner*—Patrick Edwards
(74) *Attorney, Agent, or Firm*—David M. Woods; Robert Luke Walker

(57) ABSTRACT

Deriving a three-dimensional panorama from a plurality of images of a scene generated by a range imaging camera of the type that produces ambiguities in range information includes the steps of: (a) acquiring a plurality of adjacent images of the scene, wherein there is an overlap region between the adjacent images and at least some of the adjacent images are range images; (b) providing offset data for the range images in order to recover corrected relative scene spatial information and provide a corrected range image, and (c) deriving a three-dimensional panorama from the corrected range image. In order to provide offset data, a relative range difference is detected between adjacent range images as a constant offset between the adjacent images; and the constant offset is applied to at least one of adjacent range images to correct for ambiguities in the relative ranges of the range images.

21 Claims, 10 Drawing Sheets

OTHER PUBLICATIONS

U.S. Appl. No. 09/572,522, filed May 17, 2000, Lawrence A. Ray et al.

"Practical Method of Optimization" by R. Fletcher. Second Edition. John Wiley & Sons, pp. 100-107.

"Proceedings of the 1975 International Conference on Cybernetics and Society". IEEE Systems, Man, and Cybernetics Society. Sep. 23-35, 1975, pp. 163-165.

"VRML 2.0 Sourcebook" by Andrea L. Ames, David R. Nadeau, and John L. Moreland. Second Edition. John Wiley & Sons, Inc., pp. 63-75.

"Panoramic Stereo Imaging System with Automatic Disparity Warping and Seaming" by Ho-Chao Huang and Yi-Ping Hung. Graphical Models and Image Processing, vol. 60, No. 3, May, pp. 196-208. 1998.

* cited by examiner

THREE DIMENSIONAL SPATIAL PANORAMA FORMATION WITH A RANGE IMAGING SYSTEM

FIELD OF THE INVENTION

The invention relates generally to the field of panoramic imaging technology, and in particular to the field of forming a complete three-dimensional panoramic scene.

BACKGROUND OF THE INVENTION

Panoramic imaging technology has been used for merging multiple photographs or digital images to produce a single seamless 360° panoramic view of a particular scene. A single photographic camera is usually employed in such a way that a sequence of image inputs is obtained as the camera is rotated around the focal point of the camera lens causing every two neighboring images to slightly overlap each other. The intensity values from the two neighboring images in the overlap region are weighted and then summed to form a smooth transition. The resultant panorama provides a 2D (two-dimensional) description of the environment.

There is a wide range of potential applications that requires not only intensity panorama but also panoramic three-dimensional (3D) maps associated with the intensity images, that is, a 3D description of the environment. VR technology and e-commerce are example applications where 3D panorama plays a crucial role. Virtual world and virtual objects can be built using the 3D panorama and displayed with the help of VRML (Virtual Reality Modeling Language); see Ames et al., *VRML 2.0 Sourcebook*, Second Edition, *Positioning Shapes*, Chapter 5, pp. 63–75.

In order to obtain both intensity and 3D panorama, multiple (more than one) cameras are usually utilized in constructing a panoramic 3D imaging system. There have been systems producing depth panoramic images; see Huang et al., "Panoramic Stereo Imaging System with Automatic Disparity Warping and Seaming", *Graphical Models and Image Processing*, Vol. 60, No. 3, May 1998, pp. 196–208. Huang's system utilizes a side-by-side camera system in imitating a human viewer. Another such system is described in commonly-assigned U.S. Pat. No. 6,023,588 issued Feb. 8, 2000 to Ray et al., and entitled "Method and Apparatus for Capturing Panoramic Images with Range Data". Ray's system displaces the camera vertically such that the line between the rear-nodal points of the cameras is aligned with the rotation axis.

Stereo vision techniques are commonly used in multiple camera systems to recover spatial information of the scene. Such systems yield a 3D range image where the range values may not be defined at every pixel. Imaging systems that are capable of recovering range values at every pixel (full 3D range recovery) are known in the art. For example, Cyberware, Inc. manufactures a system whereby a laser is scanned across a scene. Another method described in U.S. Pat. No. 4,935,616 (and further described in the Sandia Lab News, vol. 46, No. 19, Sep. 16, 1994) provides a scannerless range imaging system using either an amplitude-modulated high-power laser diode or an array of amplitude-modulated light emitting diodes (LEDs) to completely illuminate a target scene. An improved scannerless range imaging system that is capable of yielding color intensity images in addition to the 3D range images is described in commonly-assigned, U.S. patent application Ser. No. 09/572,522, now U.S. Pat. No. 6,349,174, filed May 17, 2000 and entitled "Method and Apparatus for a Color Scannerless Range Imaging System".

As used herein, a scannerless range imaging system will be referred to as a "SRI camera" and such a system is used in producing both intensity and 3D panoramas.

The SRI camera may be mounted to swivel at the nodal point at angular intervals and produce images; moreover, as described in commonly-assigned U.S. Pat. No. 6,118,946, these images may be captured as image bundles that are used to generate intensity and 3D range images. Like the conventional two-dimensional panorama formed by stitching two neighboring intensity images together, the three-dimensional panorama is constructed by stitching neighboring 3D images. However, problems arise when two adjacent 3D images in a sequence are merged. The 3D values of an object point measured by the SRI camera system is defined with respect to the local three-dimensional coordinate system that is fixed relative to the camera optical system. The computed 3D values of an object point in the real world space is a function of the orientation of the camera optical axis.

Because of the nature of the SRI system, there is a further problem that must be addressed when merging two adjacent range images. The SRI system actually yields phase values that describe the phase offset for each pixel relative to one wavelength of the modulated illumination. These phase values are then converted to range values (because the modulation frequency is known). This leads to two types of ambiguity. First, if the objects in the scene differ in distances greater than one wavelength of the modulated illumination, the computed range values will reflect discontinuities where the corresponding phase values transitioned from one cycle to the next. This ambiguity problem can be solved by the method described in commonly-assigned, U.S. patent application Ser. No. 09/449,101, now U.S. Pat. No. 6,288,776, which was filed Nov. 24, 1999 in the names of N. D. Cahill et al. and entitled "Method for Unambiguous Range Detection). Even if the first type of ambiguity is resolved, a second type of ambiguity exists. This ambiguity arises because the phase values returned by the SRI system do not contain any information about absolute distance to the camera. The information captured by the SRI system is only sufficient to generate relative range values, not absolute range values. Therefore, the absolute range values differ by the values computed and returned by the SRI system in the range images by some unknown constant. In general, the unknown constant for a given range image is not the same as the unknown constant for another range image. This presents a problem when attempting to merge/stitch two adjacent range images captured from the SRI system. If the unknown constants are not the same, it will be impossible to continuously merge the two images.

Therefore, two problems emerge. The first problem is that the computed 3D values in a given image are not absolutely known; they are only known relative to the other objects in the same image. Thus, an unknown constant offset must be added to every 3D value in the image. However, the constant offsets in subsequent 3D images may be different, and the difference in offsets must be determined in order to correctly merge the 3D values from neighboring scenes. Even if the first problem is solved, the 3D values of an object point in subsequent images are still dependent on orientation of the camera optical axis for each image. Consequently, distortion appears when a sequence of 3D images is used to describe the shape of an object. For instance, a smooth surface object in the three-dimensional space appears as a fragmented smooth surface object after reconstruction, using the untreated 3D images. Three methods have been shown to address the second problem in panoramic 3D map formation. Each method comprises transforming 3D values into some reference coordinate system. As described in commonly assigned, U.S. patent application Ser. No. 09/383,573, now U.S. Pat. No. 6,507,665, filed Aug. 25, 1999 in the names of Nathan D. Cahill and Shoupu Chen, and entitled "Method For Creating Environment Map Containing Information Extracted From Stereo Image Pairs", a directional transformation transforms 3D values by projecting points orthographically into a reference plane. As also described in Ser. No. 09/383,573, a perspective transformation transforms 3D values by projecting points to the common nodal axis. As described in commonly assigned, copending U.S. patent application Ser. No. 09/686,610, filed 11 Oct. 2000 in the names of Lawrence A. Ray and Shoupu Chen, and entitled "Method for Three Dimensional Spatial Panorama Formation", an (X,Y,Z,) transformation transforms 3D values into 3-element vectors describing orthographic range to a reference system.

Even though all of these approaches eliminate the problem of individual range images being defined in different coordinate systems, they are useless in the SRI camera system unless the difference in constant range offsets between subsequent images is determined.

SUMMARY OF THE INVENTION

It is an object of the invention to provide a range imaging system capable of generating 3D spatial panoramas.

It is a further object of this invention to provide a method whereby the difference between the unknown constants of adjacent range images is determined, and that difference is used to merge/stitch adjacent range images in a continuous manner.

The present invention is directed to overcoming one or more of the problems set forth above. Briefly summarized, according to one aspect of the present invention, a method for deriving a three-dimensional panorama from a plurality of images of a scene generated by a range imaging camera of the type that produces ambiguities in range information includes the steps of: (a) acquiring a plurality of adjacent images of the scene, wherein there is an overlap region between the adjacent images and at least some of the adjacent images are range images; (b) providing offset data for the range images in order to recover corrected relative scene spatial information and provide a corrected range image, and (c) deriving a three-dimensional panorama from the corrected range image. In order to provide offset data, a relative range difference is detected between adjacent range images as a constant offset between the adjacent images; and the constant offset is applied to at least one of adjacent range images to correct for ambiguities in the relative ranges of the range images.

The invention further includes a method, a system, and a computer program product for deriving a three-dimensional panorama from a plurality of images of a scene generated from a SRI camera that generates 3D range values for the images with respect to a local three-dimensional coordinate system wherein the image is captured. The invention involves acquiring a plurality of images of the scene by rotating the camera about a Y-axis (vertical axis); determining the difference in constant offsets for the relative 3D range values of subsequent images; generating (X,Y,Z) values in local three-dimensional coordinate systems for each 3D range image; selecting a reference three-dimensional world coordinate system against which the overall spatial information of the scene can be correctly presented; transforming the generated (X,Y,Z) values from each of the local three-dimensional coordinate systems to the selected reference three-dimensional world coordinate system; warping the transformed (X,Y,Z) images to correct for geometric distortion caused by the perspective projection, and forming a plurality of warped (X,Y,Z) images; registering adjacent warped (X,Y,Z) images; and forming a three-dimensional panorama, i.e., a (X,Y,Z) panorama, using the warped (X,Y,Z) images.

The advantage of the invention is that it allows for merging two adjacent range images composed of relative range values, that is, where the range information returned by the camera does not contain any information about absolute distance to the camera. Instead, the relative range information is incremented by a constant determined according to the invention and the merging of the adjacent images incorporates the determined constant.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because panoramic methods and imaging technology are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 9:
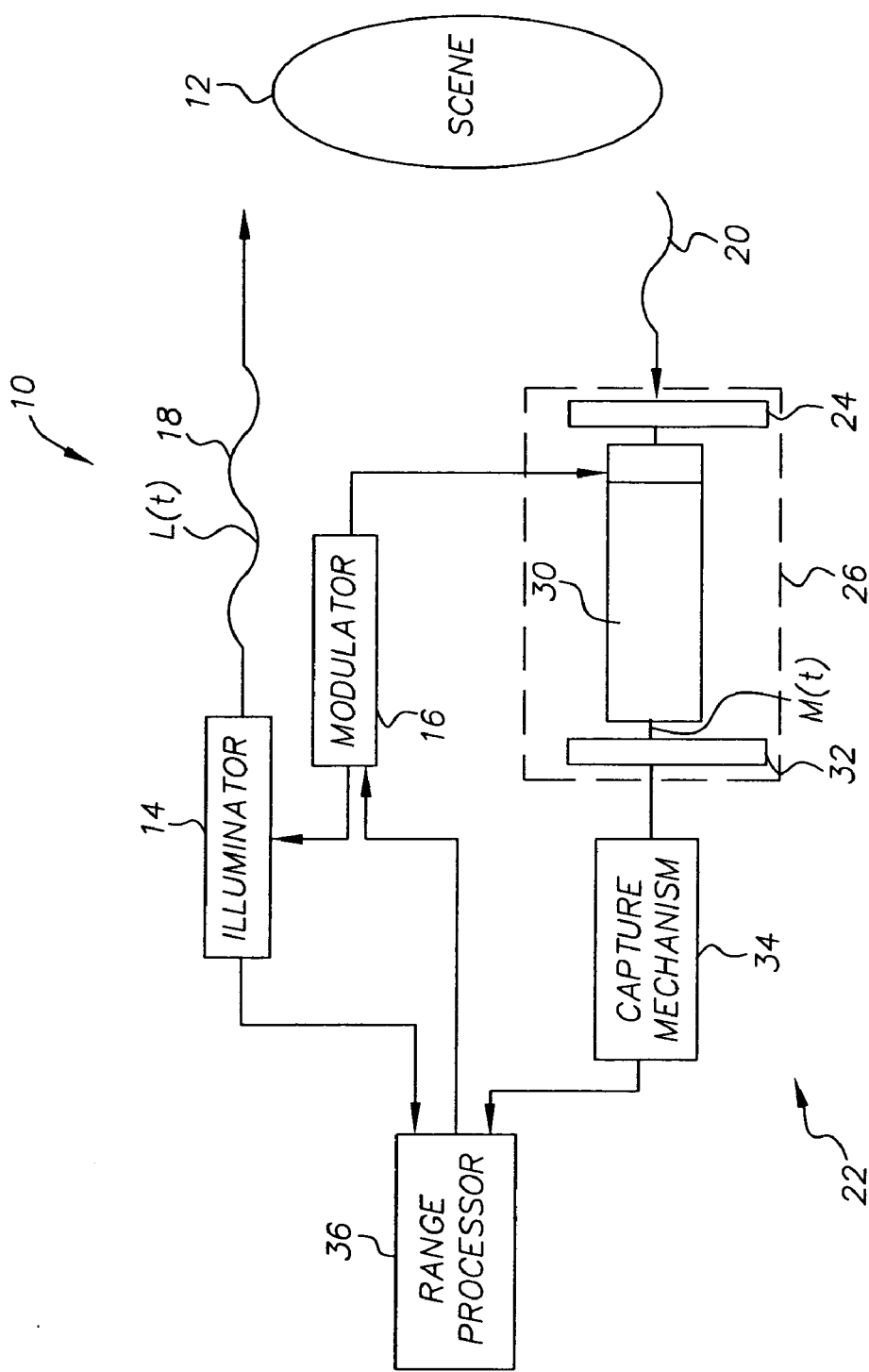
FIG. 9 is a block diagram of a known SRI camera which can be used to capture a bundle of images.

It is helpful to first review the principles and techniques involved in scannerless range imaging. Accordingly, referring first to FIG. 9, an SRI camera 10 is shown as a laser radar that is used to illuminate a scene 12 and then to capture an image bundle comprising a minimum of three images of the scene 12. An illuminator 14 emits a beam of electromagnetic radiation whose frequency is controlled by a modulator 16. Typically, in the prior art, the illuminator 14 is a laser device which includes an optical diffuser in order to effect a wide-field illumination. The modulator 16 provides an amplitude varying sinusoidal modulation. The modulated illumination source is modeled by:

$$L(t)=\mu_L+\eta \sin(2\pi\lambda t) \quad \text{(Eq. 1)}$$

where $\mu_L$ is the mean illumination, $\eta$ is the modulus of the illumination source, and $\lambda$ is the modulation frequency applied to the illuminator 14. The modulation frequency is sufficiently high (e.g., 12.5 MHz) to attain sufficiently accurate range estimates. The output beam 18 is directed toward the scene 12 and a reflected beam 20 is directed back toward a receiving section 22. As is well known, the reflected beam 20 is a delayed version of the transmitted output beam 18, with the amount of phase delay being a function of the distance of the scene 12 from the range imaging system. The reflected beam 20 strikes a photocathode 24 within an image intensifier 26, thereby producing a modulated electron stream proportional to the input amplitude variations. The output of the image intensifier 26 is modeled by:

$$M(t)=\mu_M+\gamma \sin(2\pi\lambda t) \quad \text{(Eq. 2)}$$

where $\mu_M$ is the mean intensification, $\gamma$ is the modulus of the intensification and $\lambda$ is the modulation frequency applied to the intensifier 26. The purpose of the image intensifier is not only to intensify the image, but also to act as a frequency mixer and shutter. Accordingly, the image intensifier 26 is connected to the modulator 16, causing the gain of a microchannel plate 30 to modulate. The electron stream from the photocathode 24 strikes the microchannel plate 30 and is mixed with a modulating signal from the modulator 16. The modulated electron stream is amplified through secondary emission by the microchannel plate 30. The intensified electron stream bombards a phosphor screen 32, which converts the energy into a visible light image. The intensified light image signal is captured by a capture mechanism 34, such as a charge-coupled device (CCD). The captured image signal is applied to a range processor 36 to determine the phase delay at each point in the scene. The phase delay term $\omega$ of an object at a range $\rho$ meters is given by:

$$\omega = \frac{2\rho\lambda}{c} \mod 2\pi \quad \text{(Eq. 3)}$$

where c is the velocity of light in a vacuum. Consequently, the reflected light at this point is modeled by:

$$R(t)=\mu_L+\kappa \sin(2\pi\lambda t+\omega) \quad \text{(Eq. 4)}$$

where $\kappa$ is the modulus of illumination reflected from the object. The pixel response P at this point is an integration of the reflected light and the effect of the intensification:

$$P = \int_0^{2\pi} R(t)M(t)dt = 2\mu_L\mu_M + \kappa\pi\gamma\cos(\omega) \quad \text{(Eq. 5)}$$

In the range imaging system disclosed in the aforementioned U.S. Pat. No. 4,935,616, which is incorporated herein by reference, a reference image is captured during which time the micro-channel plate is not modulated, but rather kept at a mean response. The range is estimated for each pixel by recovering the phase term as a function of the value of the pixel in the reference image and the phase image.

A preferred, more robust approach for recovering the phase term is described in U.S. Pat. No. 6,118,946, entitled "Method and Apparatus for Scannerless Range Image Capture Using Photographic Film", which is incorporated herein by reference. Instead of collecting a phase image and a reference image, this approach collects at least three phase images (referred to as an image bundle). This approach shifts the phase of the intensifier 26 relative to the phase of the illuminator 14, and each of the phase images has a distinct phase offset. For this purpose, the range processor 36 is suitably connected to control the phase offset of the modulator 16, as well as the average illumination level and such other capture functions as may be necessary. If the image intensifier 26 (or laser illuminator 14) is phase shifted by $\theta_i$, the pixel response from equation (5) becomes:

$$P_i=2\mu_L\mu_M\pi+\kappa\pi\gamma \cos(\omega+\theta_i) \quad \text{(Eq. 6)}$$

It is desired to extract the phase term $\omega$ from the expression. However, this term is not directly accessible from a single image. In equation (6) there are three unknown values and the form of the equation is quite simple. As a result, mathematically only three samples (from three images) are required to retrieve an estimate of the phase term, which is proportional to the distance of an object in the scene from the imaging system. Therefore, a set of three images captured with unique phase shifts is sufficient to determine $\omega$. For simplicity, the phase shifts are given by $\theta_k=2\pi k/3$; k=0, 1, 2. In the following description, an image bundle shall be understood to constitute a collection of images which are of the same scene, but with each image having a distinct phase offset obtained from the modulation applied to the intensifier 26. It should also be understood that an analogous analysis can be performed by phase shifting the illuminator 14 instead of the intensifier 26. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with n≧3 distinct phase offsets of the intensifier (or laser or a combination of both) these images form an image bundle. Applying Equation (6) to each image in the image bundle and expanding the cosine term (i.e., $P_i=2\mu_L\mu_M\pi+\kappa\pi\gamma(\cos(\omega)\cos(\theta_i)-\sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{(Eq. 7)}$$

where $\Lambda_1=2\mu_L\mu_M\pi$, $\Lambda_2=\kappa\pi\gamma \cos\omega$, and $\Lambda_3=\kappa\pi\gamma \sin\omega$. This system of equations is solved by a singular value decomposition to yield the vector $\Lambda=[\Lambda_1, \Lambda_2, \Lambda_3]^T$. Since this calculation is carried out at every (x,y) location in the image bundle, Λ is really a vector image containing a three element vector at every point. The phase term ω is computed at each point using a four-quadrant arctangent calculation:

$$\omega = \tan^{-1}(\Lambda_3, \Lambda_2) \quad \text{(Eq. 8)}$$

The resulting collection of phase values at each point forms the phase image. Once phase has been determined, range r can be calculated by:

$$r = \omega \frac{c}{4\pi\lambda} \quad \text{(Eq. 9)}$$

Equations (1)–(9) thus describe a method of estimating range using an image bundle with at least three images (i.e., n=3) corresponding to distinct phase offsets of the intensifier and/or illuminator.

Figure 10:
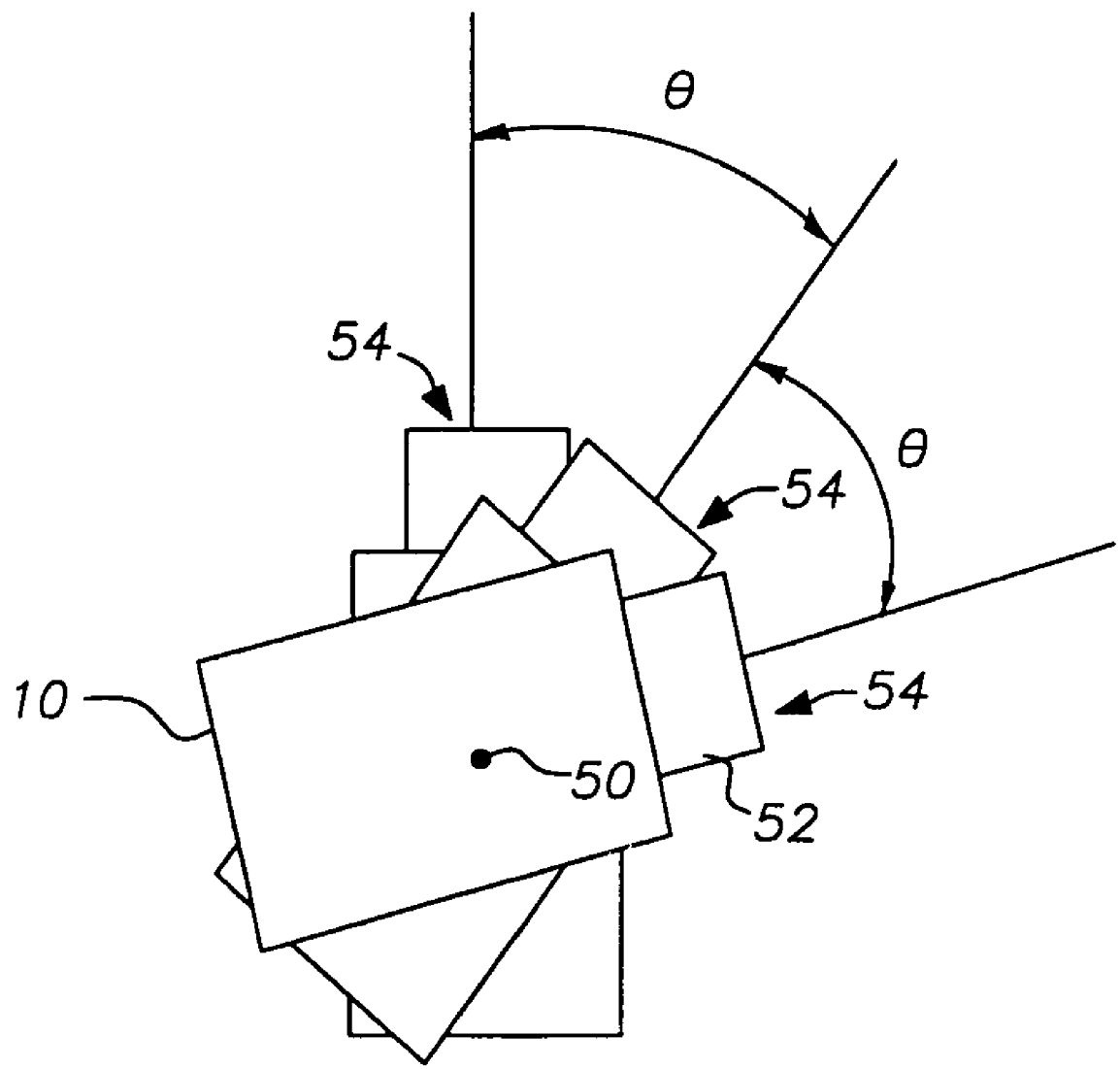
FIG. 10 is an illustration of the use of an SRI camera in a panoramic imaging application.

FIG. 10 shows the use of an SRI camera 10 in a panoramic imaging application. A single SRI camera 10 is mounted to pivot about a Y-axis (vertical axis) centered about focal point 50 through a number of capture positions 54, each separated by an angle θ that provides an overlapping field of view between neighboring positions. The y-axis through focal point 50 is arranged to be coincident with the focal point 50 of lens 52 of the SRI camera 10. In this manner, a sequence of image inputs are obtained as the SRI camera 10 is rotated around the focal point 50 of the cameral lens 52, causing each successive image to slightly overlap its neighboring image. Since each input corresponds to an image bundle, a plurality of image bundles of the scene are acquired by rotating the SRI camera 10 about its Y-axis (vertical axis), wherein there is an overlap region between adjacent image bundles. Although an SRI (scannerless range imaging) camera is used in the preferred embodiment, it should be understood that the invention may be used in connection with other types of range imaging systems, such as scanned systems, and the claims, unless specifically directed to SRI systems, are intended to read without limitation on any kind of range imaging system. Similarly, although the collection of image bundles is the preferred embodiment, it should be understood that the invention is not limited to any specific image collection. Moreover, there may be applications, e.g., in creating virtual images of small objects, where the SRI camera may be stationary and the "scene" may be rotated, e.g., on a turntable, in order to obtain overlapping images.

Figure 1:
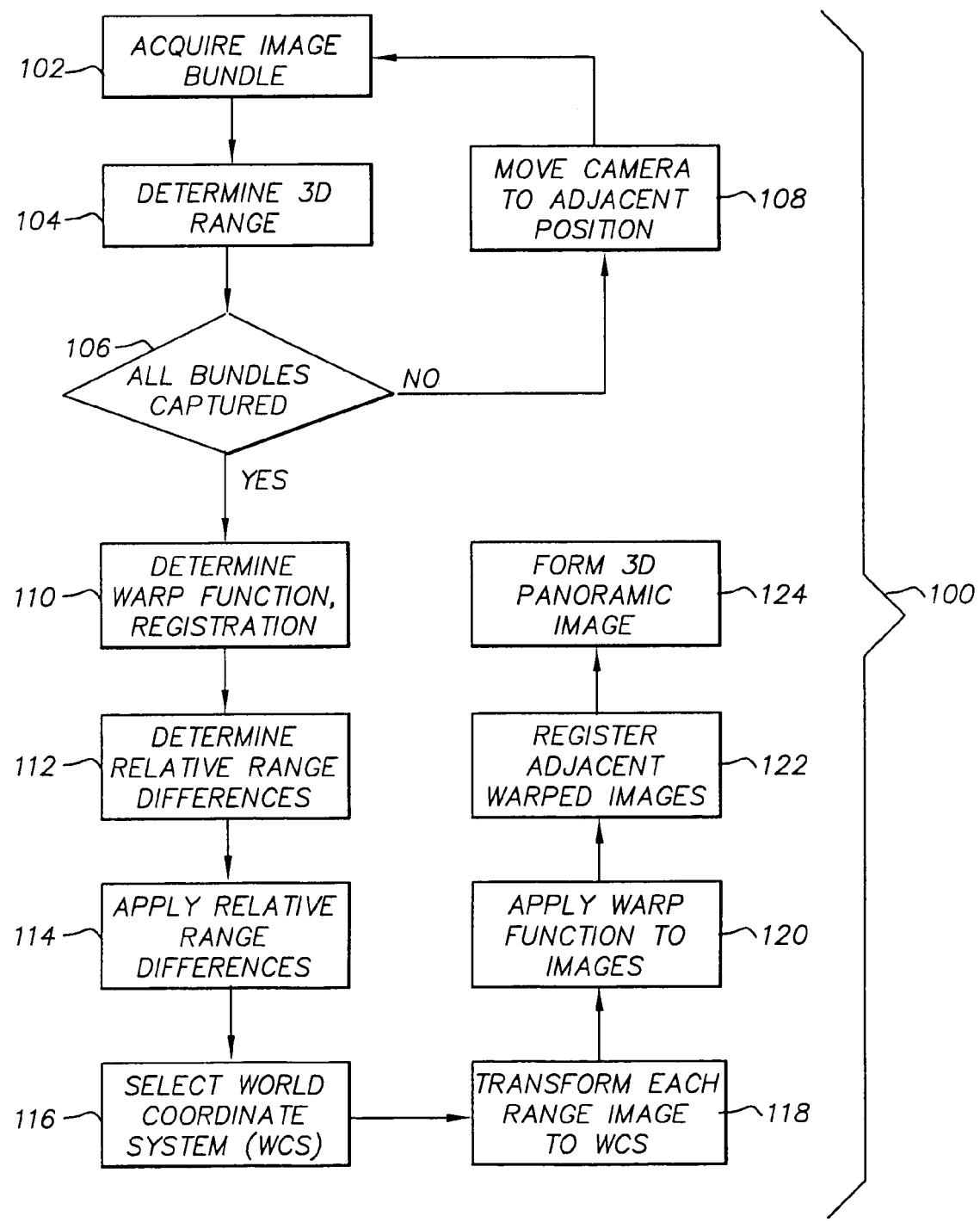
FIG. 1 illustrates the method steps involved in the formation of a three-dimensional panorama with color texture mapped for a graphics display in accordance with the invention.

Referring now to FIG. 1, a image processing method 100 is shown according to the invention for deriving a three-dimensional panorama from a plurality of image bundles of a scene generated from an SRI camera, including the steps of acquiring an image bundle 102 with the SRI camera, determining a range 104, capturing all image bundles 106, moving the SRI camera to an adjacent position 108, determining a warp function and a registration point 110, determining relative range differences 112, applying the relative range differences 114, selecting a world coordinate system 116, transforming each range image to the world coordinate system 118, warping the images 120, registering the adjacent warped images 122, and forming a 3D panoramic image 124.

The image processing method 100 forms a complete three-dimensional scene panorama for virtual reality visualization. The method 100 uses an image bundle 102 to generate a corresponding spatial image, e.g. an (X,Y,Z) image, in step 104. An inquiry of whether all image bundles have been captured is performed 106. A negative response to the inquiry causes the SRI camera to move to an adjacent position in step 108. A warping function and registration point is computed 110 and used to determine the differences in constant offsets of the relative 3D range values between image bundles captured from adjacent positions in step 112. Once these differences have been determined, they are applied to the spatial images in step 114. An arbitrary reference three-dimensional world coordinate system is established in step 116 to uniquely describe the spatial property of the scene captured. All the estimated spatial images are transformed in step 118 to the reference three-dimensional world coordinate system with a homogeneous transformation matrix that is constructed based on the information of the capturing device. The transformed spatial images are stitched together to form a spatial panorama after a cylindrical warping procedure 120 and a registration process 122. Likewise, the intensity images are stitched together to form an intensity panorama in step 124 after the same procedures. Both spatial and intensity panoramas are used in a virtual display with no further transformation operation needed.

Figure 2:
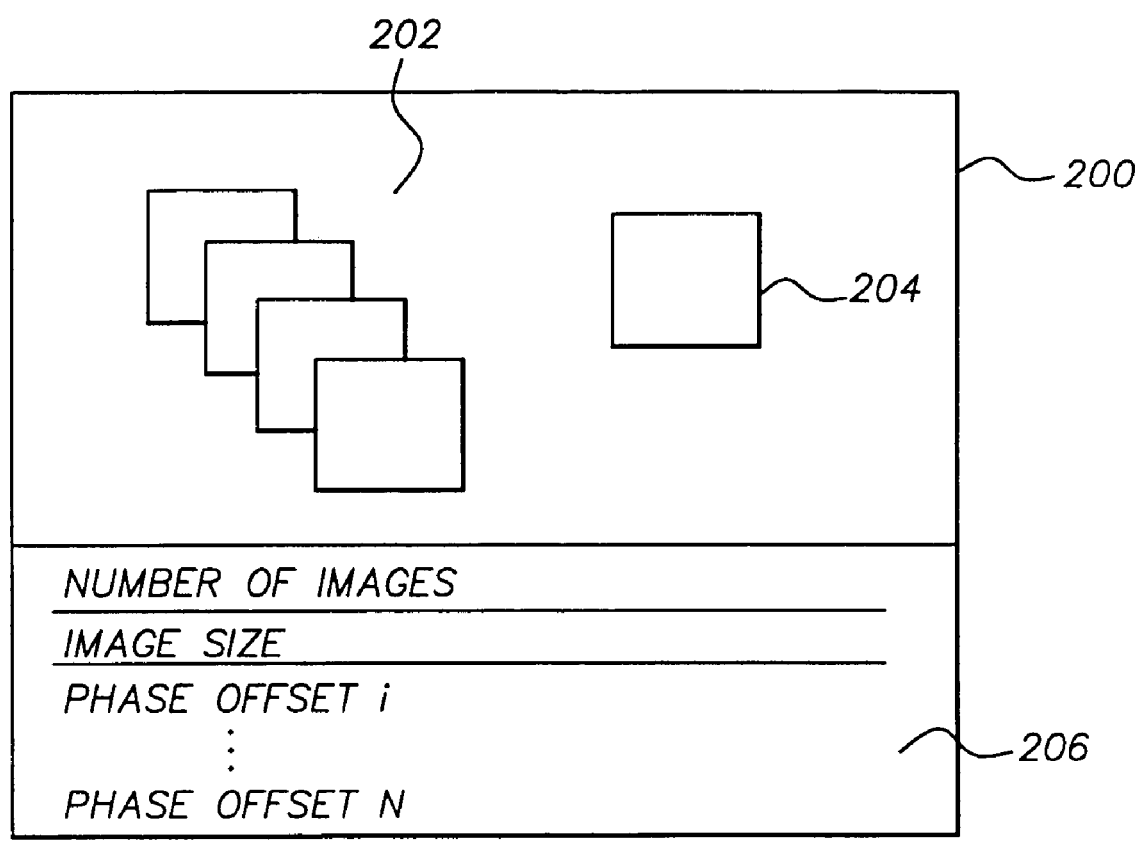
FIG. 2 depicts an image bundle used in connection with the method of FIG. 1.

The notion of an image bundle is an important aspect of a preferred range estimation method using an SRI camera. As shown in relation to FIG. 2, an image bundle 200 includes a combination of images captured by the SRI system as well as information pertinent to the individual images and information common to all the images. The image bundle contains two types of images: range images 202 related to the image capture portion of the SRI process and an intensity image 204, which may be a color image. Common information 206 in the image bundle 200 would typically include the number of range images in the bundle (three or more) and the modulation frequency used by the SRI system. Other information might be the number of horizontal and vertical pixels in the images, and/or data related to camera status at the time of the image capture. Image specific information will include the phase offset 1 . . . N used for each (1 . . . N) of the individual range images 202. The image bundle 200 includes a minimum of three such images, each of which are monochrome. The additional intensity image 204 is an image using an optical channel of the SRI camera that does not contain range capture components. For example, as disclosed in the aforementioned U.S. Pat. No. 6,349,174, which is incorporated herein by reference, a beamsplitter is used to establish two optical paths: one path contains the range imaging elements and the other path contains regular optics for transmitting the intensity (e.g., color) image. An optical network (including light control means such as a shutter) recombines the image paths toward a single image responsive element, and a range image and a intensity image are separately, and sequentially, captured. Alternatively, the range imaging elements and regular optics may be interchanged in a single optical path. Although the intensity image may be a color image, it is preferably, but not necessarily, the same size as the range images 202.

Figure 3A:
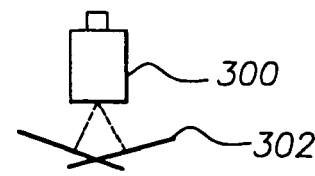
FIGS. 3A and 3B illustrate the relationship between the image plane and a cylindrically warped image plane.
Figure 3A:
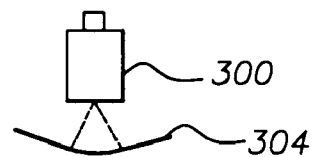
Figure 3B:
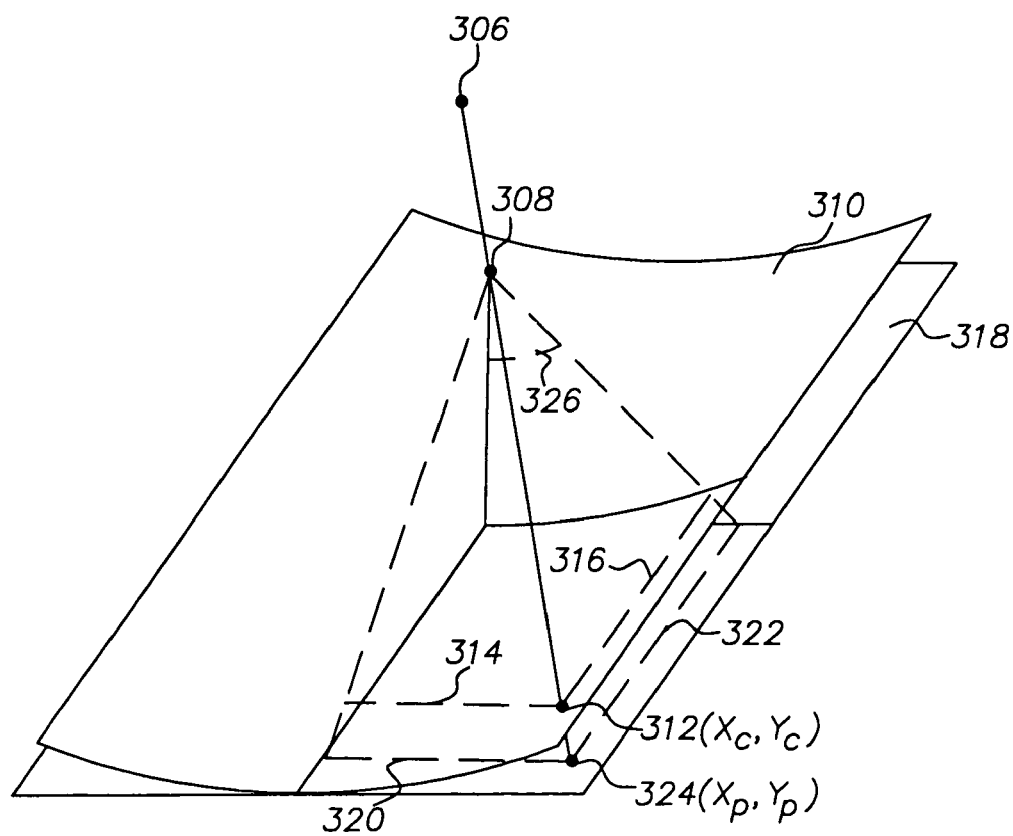

Once an image bundle has been acquired, it is used to determine 3D range 104. Referring to FIGS. 3A and 3B, because images captured from a camera 300 are projections of objects through the nodal point of the taking lens into a plane, an inherent distortion exists. Objects near the center of an image appear smaller than objects near the edges; this distortion is evident in regions of overlap between images 302. In order to create a spatial panorama containing no distortion, the intensity images and 3D range images must eventually be warped.

One such warp that corrects for the distortion (but not the only such warp) is a cylindrical warp 110, where the images are warped onto a cylinder 304 about the vertical axis of the cylinder. This warping technique is described in detail in the aforementioned U.S. patent application Ser. No. 09/383,573, now U.S. Pat. No. 6,507,665, "Method For Creating Environment Map Containing Information Extracted From Stereo Image Pairs", which is incorporated herein by reference. Briefly described, the warp can be described by a function $W(x_p,y_p)$ that maps pixel 324 $(x_p,y_p)$ in the image plane 318 to pixel 312 $(x_c,y_c)$ in the warped plane 310. The cylindrical warping function $W(x_p,y_p)$ can be determined in the following manner; suppose the real world point 306 is projected through the rear nodal point 308 of the taking lens onto the cylinder 304 at point 312 $(x_c,y_c)$, where $x_c$ is the horizontal pixel coordinate 314 and $y_c$ is the vertical pixel coordinate 316 (relative to the orthogonal projection of the nodal point 308 onto the image plane 318). The intensity/range value assigned to the cylindrically warped image at point 312 $(x_c,y_c)$ should be the intensity/range value found at point 324 $(x_p,y_p)$ in the planar image 318, where $x_p$ is the horizontal pixel coordinate 320 and $y_p$ is the vertical pixel coordinate 322 of point 324. It can be shown that $(x_p,y_p)$ can be computed in the following way:

$$x_p = \frac{\tan(x_c p_x / f)}{p_x / f}, \quad \text{(Eq. 10)}$$

$$y_p = \begin{cases} \frac{y_c \tan(x_c p_x / f)}{x_c p_x / f}, & x_c \neq 0 \\ y_c, & x_c = 0, \end{cases} \quad \text{(Eq. 11)}$$

where $p_x$ is the length of pixels of the image plane 318 in the x-direction and f is the focal length of the taking lens. In general, $(x_p,y_p)$ will not be integer valued, so it is appropriate to interpolate nearby intensity values. For range values it is only appropriate to assign the value of the pixel nearest $(x_p,y_p)$.

Figure 4:
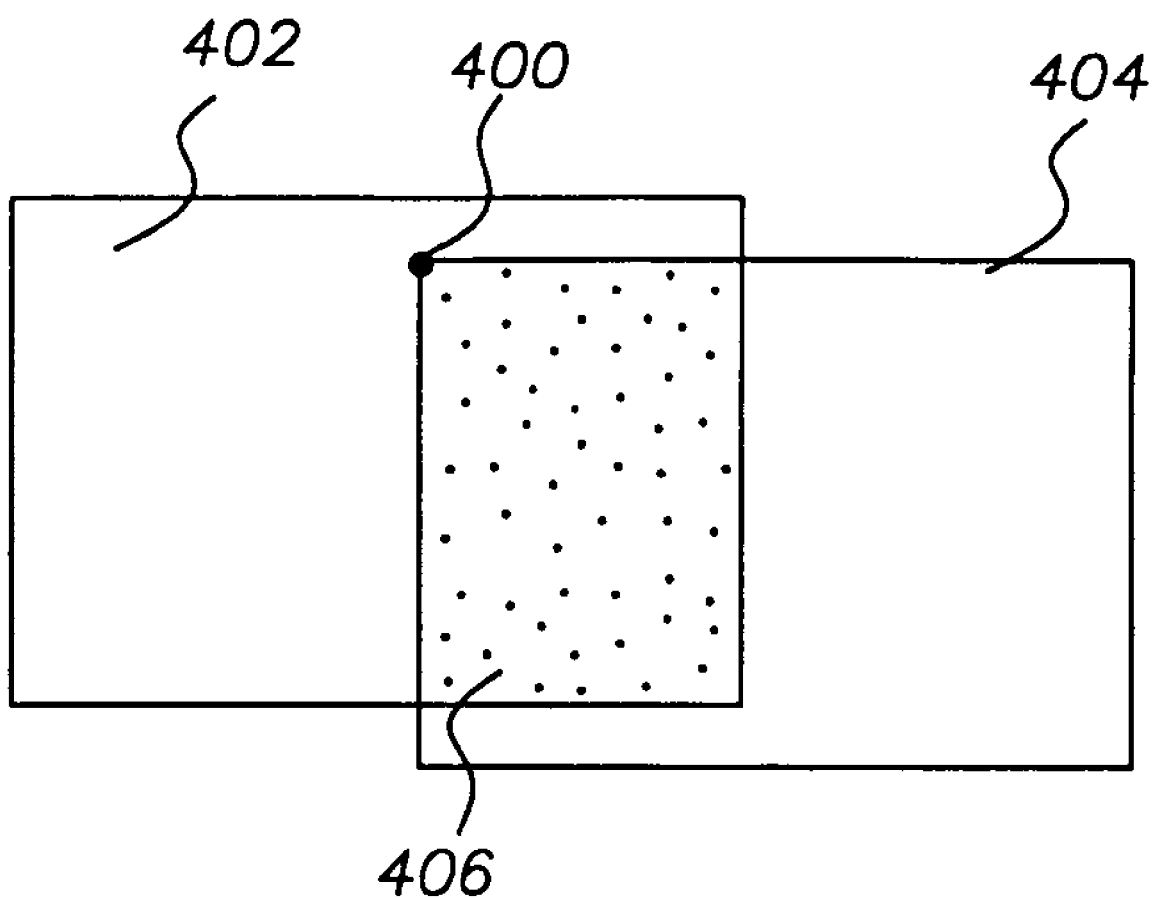
FIG. 4 shows the registration of adjacent images.

Referring to FIG. 4, the registration point 400 of adjacent images 402 and 404 warped by the warping function W must be found. Any of a variety of image alignment techniques can be used to register the warped left 402 and right 404 images; e.g., see C. D. Kuglin and D. C. Hines, "The Phase Correlation Image Alignment Method", *Proc.* 1975 *International Conference on Cybernetics and Society*, pp. 163–165, 1975, which is incorporated herein by reference. Although the adjacent warped intensity images and the adjacent warped range images may be separately registered, since the coordinates of the range images correspond exactly to those of the intensity images, common values in the adjacent warped intensity images are registered and then registration points in the warped range images are defined to be in the same locations as those used for registering the intensity images. The output of the image alignment method yields the overlap region 406 between the left 402 and right 404 warped intensity images. The registration point 400 is taken to be the upper left hand corner of the overlap region 406; but, in general, can be defined as any point which identifies the location of the overlap region.

Figure 5A:
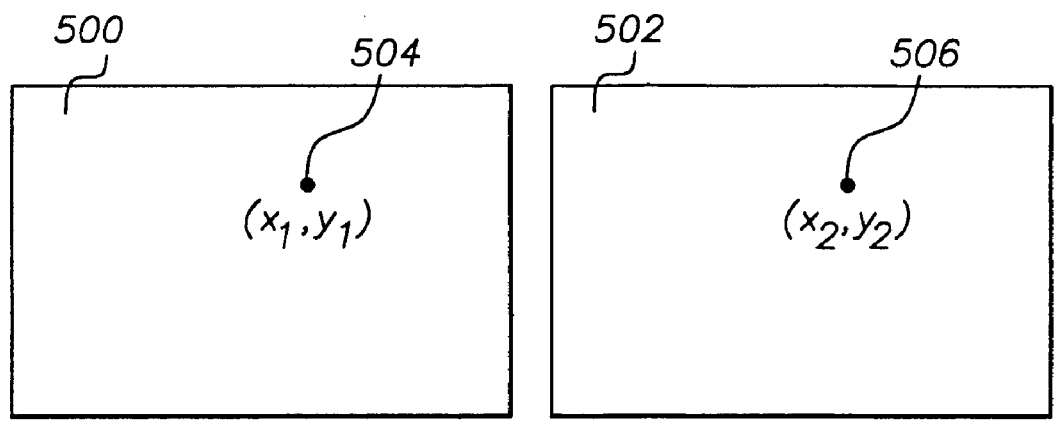
FIGS. 5A and 5B show the relationship between range values in adjacent images.
Figure 5B:
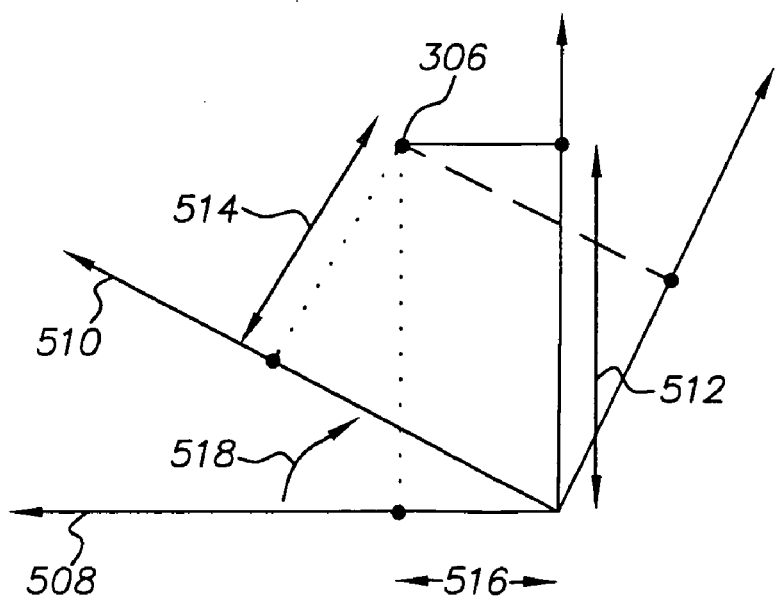

In order to determine the difference in constant range offsets between subsequent images, we employ an optimization procedure. Referring to FIGS. 5A and 5B, we compare adjacent 3D range images 500 (left) and 502 (right). If we consider that pixel $(x_1,y_1)$ 504 in the left image 500 and pixel $(x_2,y_2)$ 506 in the right image contain relative range values (say $d_1$ and $d_2$, respectively) to the same real world point 306, then we know by definition that $d_1$ is measured orthogonally to the left image plane 500, and that $d_2$ is measured orthogonally to the right image plane 502. In addition, one caveat of the SRI cameras is that 3D range values are known only in relation to one another, not as absolute distances to the image plane. Therefore, it is necessary to recover corrected relative scene spatial information and, consequently, there is an unknown constant offset that must be accounted for in order to correctly compare the 3D range values in the left 500 and right 502 images.

FIG. 5B illustrates the difference in the local coordinate systems that describe the range values in the left 500 and right 502 images. Looking down the nodal axis of the SRI camera, 508 is parallel to the x-axis of the left image 500, and 510 is parallel to the x-axis of the right image 502. The real world point 306 projected into both images is found to have a 3D range value 512 of $d_1$ in the left image 500 and a 3D range value 514 of $d_2$ in the right image 502. The angle 518 between the image planes is known a priori, and is denoted $\theta$. If the 3D range values $d_1$ and $d_2$ are known absolutely, then it can easily be shown that:

$$d_2 = \frac{d_1}{f}(\beta \sin\theta + \cos\theta), \quad \text{(Eq. 12)}$$

where f is the focal length of the SRI camera and $\beta$ 516 is the horizontal distance from the center of the image to the pixel containing the projection of 306. Since the 3D range values $d_1$ and $d_2$ are not known absolutely, the relationship between $d_1$ and $d_2$ becomes:

$$d_2 = \frac{d_1 + \alpha}{f}(\beta \sin\theta + \cos\theta), \quad \text{(Eq. 13)}$$

where $\alpha$ is the unknown constant offset between the relative 3D range values.

Figure 6:
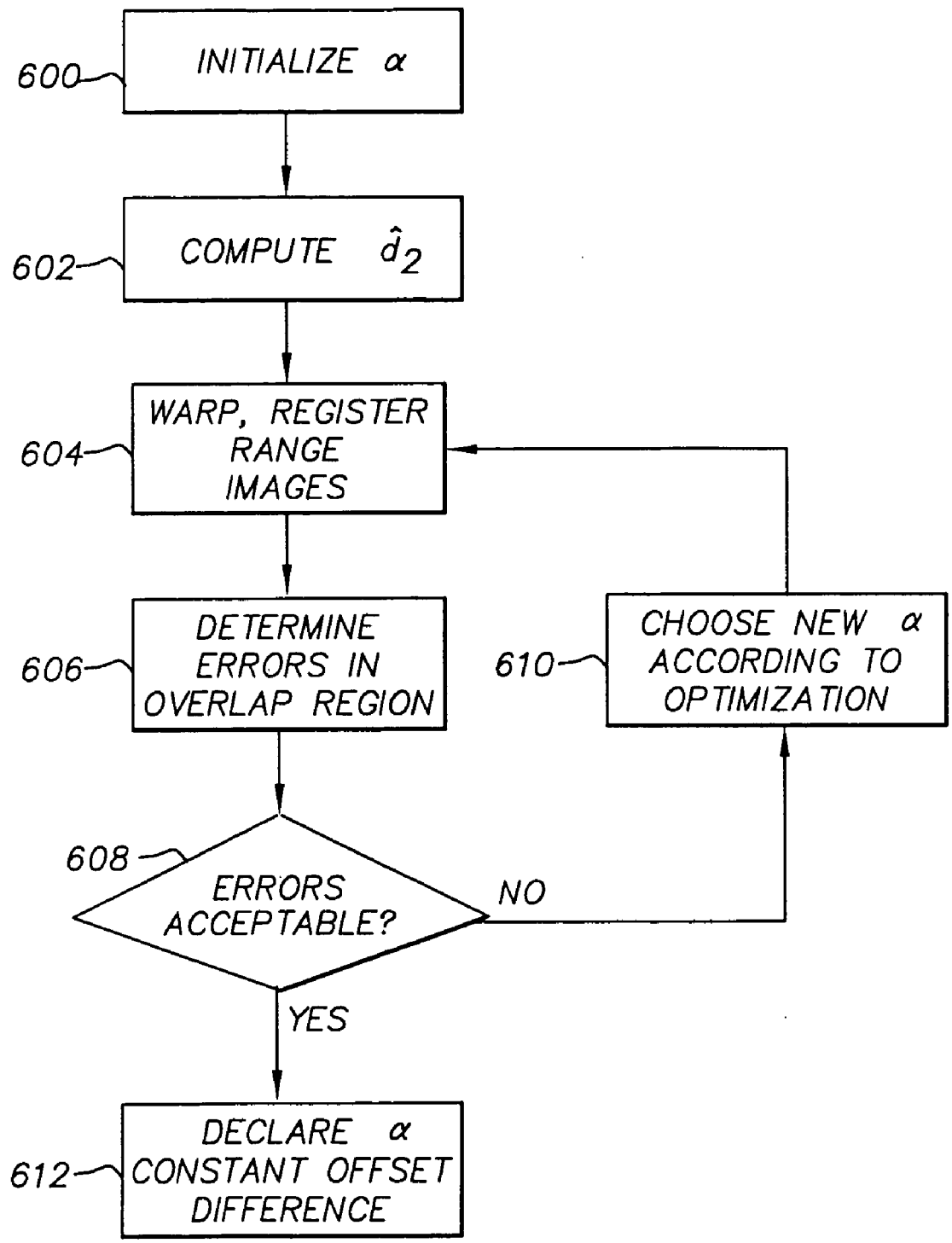
FIG. 6 illustrates the method steps involved in the determination of relative range differences between adjacent images.

FIG. 6 describes the process 112 (referred to in FIG. 1), whereby an estimate for $\alpha$ is determined. In 600, an initial estimate for $\alpha$ is chosen; e.g., $\alpha=0$. In 602, the right hand side of Equation 13 is evaluated, yielding $\hat{d}_2$, an estimate of the 3D range value in the right image. In 604, the 3D range images are warped according to the warp function W, and then they are registered using the pre-determined registration point 400. The error between the predicted $\hat{d}_2$ values and the actual $d_2$ values in the overlap region 406 of the warped registered images are computed 606 by calculating the difference $\hat{d}_2 - d_2$ at each pixel, squaring this difference, and then summing the squared difference values for all overlapping pixels. An inquiry is made 608 as to whether the errors (measured by the summed squared difference values) is acceptable. If the result of the inquiry is negative, a new estimate for $\alpha$ is chosen according to some optimization scheme 610 (e.g., Newton's method, line search, etc., see Fletcher, *Practical Methods of Optimization*, $2^{nd}$ Edition, John Wiley & Sons, 1987). A good choice is the Levenberg-Marquardt optimization scheme, which is described in the aforementioned Fletcher reference (pages 100–107). When the result of the inquiry 608 is finally affirmative, the current estimate for α is chosen 612 to be the relative range difference between the two images. According to 114 (referring to FIG. 1), the relative range difference α is added to each 3D range value in the left image 500. Note that once the relative range difference has been applied, the range values in the left 500 and right 502 images will not be absolute; rather, they will still be relative, but with consistent constant offsets.

Once the relative range differences have been applied to all of the 3D range images, the resulting corrected 3D values are used to form spatial images (X,Y,Z) for the scene. It should be noted that the resulting spatial images are valid for a local three-dimensional coordinate system only. That is, for image 500, the (X,Y,Z) values are given with respect to local three-dimensional coordinate system $^1XY^1Z$; for image 502, the 3D values are given with respect to local three-dimensional coordinate system $^2XY^2Z$. If a panoramic image sequence is composed with N pairs of images, there will be N different three-dimensional coordinate systems with respect to which the (X,Y,Z) values are computed.

Figure 7:
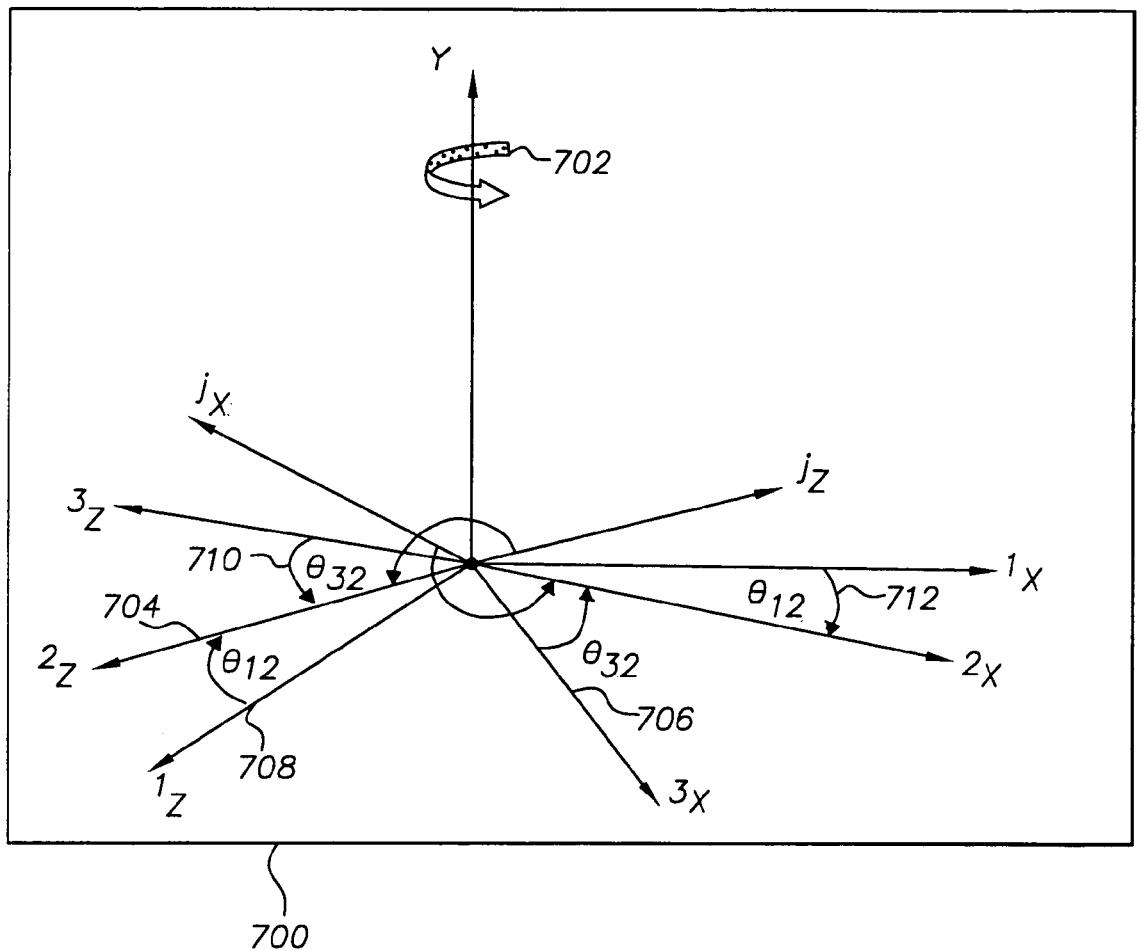
FIG. 7 illustrates the transformation of the corrected 3D data from each of the individual three-dimensional coordinate systems determined by the camera orientation to a common reference three-dimensional coordinate system.

FIG. 7 includes an example coordinate system transformation 700, a rotation direction 702, a reference coordinate system 704, a pre-transformation (A) coordinate system 706, a pre-transformation (B) coordinate system 708, an angle 710 between coordinate systems 706 and 704, an angle 712 between coordinate systems 708 and 704.

Figure 8:
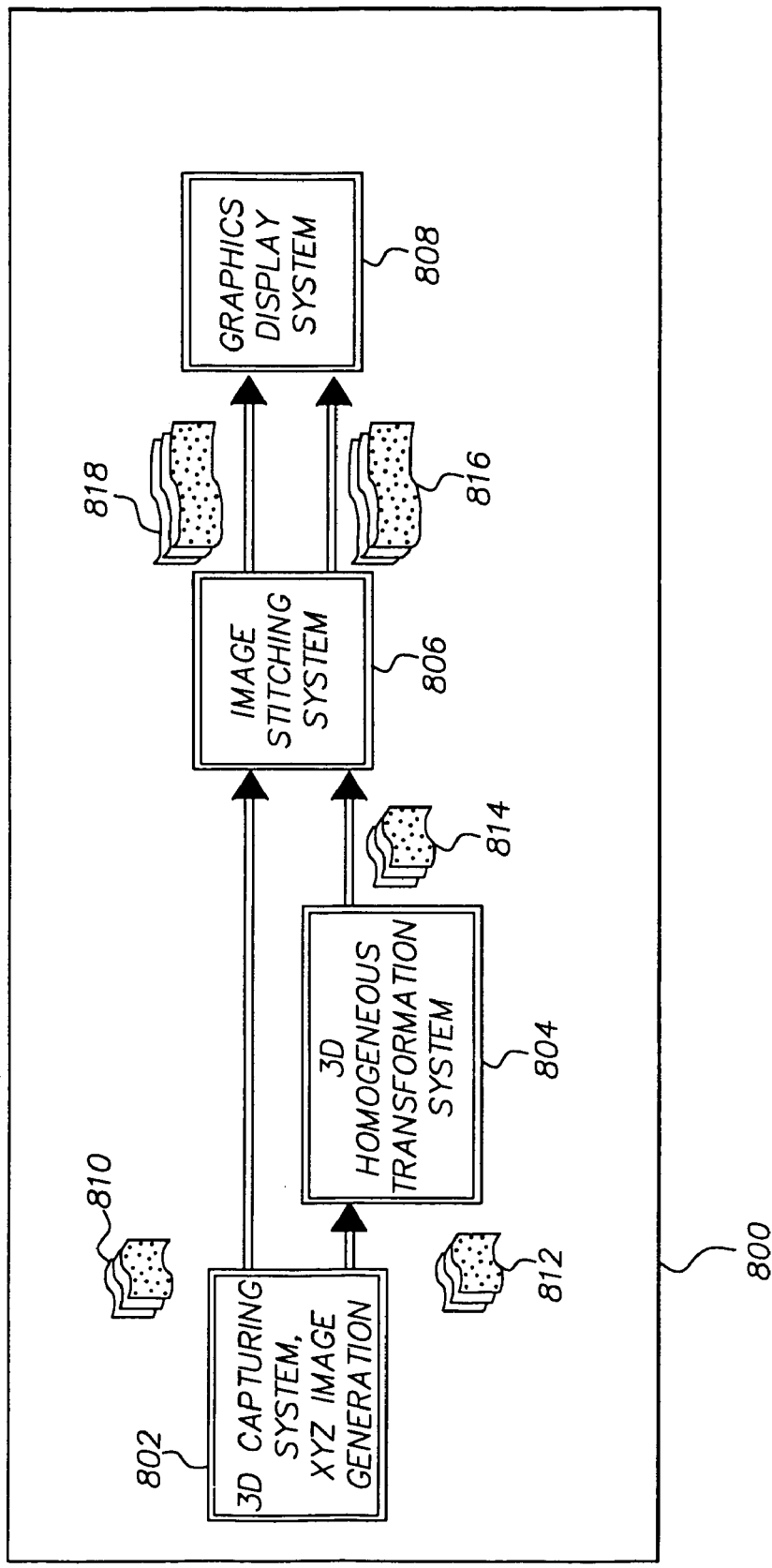
FIG. 8 shows a block diagram of a three-dimensional panoramic imaging system according to the present invention.

FIG. 8 shows a three-dimensional panoramic imaging system 800, including a panoramic 3D capturing system 802, a reference coordinate system 804, an image stitching system 806, a graphics display system 808, a plurality of intensity (R,G,B) images 810, a plurality of spatial (X,Y,Z) images, a sequence of transformed images 814, a stitched spatial panorama 816, and a stitched intensity panorama 818.

In operation, the three-dimensional panoramic imaging system 800 enables the 3D panoramic capturing system 802 to produce a sequence of three-dimensional (X,Y,Z) images 812 as well as a sequence of (R,G,B) images 810. In accordance with the present invention, each of the (X,Y,Z) images generated from the captured sequence is transformed to a common three-dimensional coordinate system 804 from its local three-dimensional coordinate system at which the corresponding (R,G,B) image is taken and the original (X,Y,Z) image is computed. The transformed (X,Y,Z) images in a sequence are stitched together in the image stitching system 806 producing a stitched (X,Y,Z) panorama 816. The intensity (R,G,B) images are stitched together in the image stitching system 806 producing a (R,G,B) panorama 818. The stitched (X,Y,Z) panorama 816 and (R,G,B) panorama 818 are fed to a graphics display system 808 to generate a virtual world.

In accordance with the present invention, a common reference three-dimensional coordinate system (i.e. a world coordinate system) is arbitrarily selected, all the (X,Y,Z) values computed for all the image pairs are transformed from their original local three-dimensional coordinate system to the selected world coordinate system. As an example, referring to FIG. 7, the coordinate system $^2XY^2Z$ 704 is chosen as the world coordinate system, all data computed are then transformed to the world coordinate system with the method described below.

For example, denote a three-dimensional point in local coordinate system j by $$^jP = [^jX_p, ^jY_p, ^jZ_p, 1] \quad \text{(Eq. 14)}$$

then the homogeneous transformation from local coordinate system j to world coordinate system i can be represented by $$^iP = [T^i_j]^jP \quad \text{(Eq. 15)}$$

For cases as shown in FIG. 7 where only rotation about the Y axis exists, then the transformation matrix $$T^i_j = \begin{bmatrix} \cos(\theta_{ji}) & 0 & -\sin(\theta_{ji}) & 0 \\ 0 & 1 & 0 & 0 \\ \sin(\theta_{ji}) & 0 & \cos(\theta_{ji}) & 0 \\ 0 & 0 & 0 & 1 \end{bmatrix} \quad \text{(Eq. 16)}$$

where $\theta_{ji}$ is the rotation angle from local coordinate system j to world coordinate system i about the Y axis. For a more general homogenous transformation matrix $$T^i_j = \begin{bmatrix} t_{11} & t_{12} & t_{13} & t_{14} \\ t_{21} & t_{22} & t_{23} & t_{24} \\ t_{31} & t_{32} & t_{33} & t_{34} \\ 0 & 0 & 0 & 1 \end{bmatrix} \quad \text{(Eq. 17)}$$

where $t_{11} = \cos(\theta_{ji}) \cos(\kappa_{ji})$ $t_{12} = \sin(\omega_{ji}) \sin(\theta_{ji}) \cos(\kappa_{ji}) + co(\omega_{ji}) \sin(\kappa_{ji})$ $t_{13} = -\cos(\omega_{ji}) \sin(\theta_{ji}) \cos(\kappa_{ji}) + \sin(\omega_{ji}) \sin(\kappa_{ji})$ $t_{21} = -\cos(\theta_{ji}) \sin(\kappa_{ji})$ $t_{22} = -\sin(\omega_{ji}) \sin(\theta_{ji}) \sin(\kappa_{ji}) + \cos(\omega_{ji}) \cos(\kappa_{ji}) \quad \text{(Eq. 18)}$ $t_{23} = \cos(\omega_{ji}) \sin(\theta_{ji}) \sin(\kappa_{ji}) + \sin(\omega_{ji}) \cos(\kappa_{ji})$ $t_{31} = \sin(\theta_{ji})$ $t_{32} = -\sin(\omega_{ji}) \cos(\theta_{ji})$ $t_{33} = \cos(\omega_{ji}) \cos(\theta_{ji})$ $t_{14} = x_{ji}$ $t_{24} = y_{ji}$ $t_{34} = z_{ji}$ where $\theta_{ji}$ is the rotation angle from local coordinate system j to world coordinate system i about the Y axis, $\omega_{ji}$ is the rotation angle about the X axis, $\kappa_{ji}$ is the angle about Z axis, $x_{ji}$ is the translation between local coordinate system j and world coordinate system i along X axis, $y_{ji}$ is the translation along Y axis, and $z_{ji}$ is the translation along Z axis.

It should be pointed out that all coordinate systems are defined by the right-hand rule (as defined in Stewart, *Calculus*, $2^{nd}$ Edition, Brooks/Cole, 1991, p. 639). Rotation angles ω, θ, and κ are defined positive if they are counter-clockwise when viewed from the positive end of their respective axes. Positive rotation angle θ for example, is shown in FIG. 7 as $\theta_{32}$ 710 for transforming coordinate system $^3XY^3Z$ 706 to coordinate system $^2XY^2Z$ 704. While $\theta_{12}$ 712 is negative since the transformation is made from coordinate system $^1XY^1Z$ 708 to coordinate system $^1XY^1Z$ 704, which presents a clockwise rotation. Arrow 702 indicates the counterclockwise rotation.

After applying the above example homogenous transformation to each of the (X,Y,Z) images 812 generated from the panoramic 3D capturing system 802, a sequence of transformed (X,Y,Z) images 814 from each of the local three-dimensional coordinate systems to the selected reference three-dimensional world coordinate system is produced. The sequence of transformed (X,Y,Z) images ready is stitched together in image stitch block 806 where the sequence of (R,G,B) images is also stitched. Since images are a perspective projection of real world objects onto a plane, an inherent distortion exists. In order to remove this distortion and keep sizes of objects consistent between the inter-pair images, the (R,G,B) and corresponding transformed (X,Y,Z) images must be first warped from a planar surface to another domain such as a cylindrical surface. Thus a plurality of warped images may be formed. The predetermined warp function W can be used. Then, the pre-identified registration points of adjacent sets of overlapping cylindrically warped (R,G,B) images are used to stitch together the cylindrically warped (R,G,B) images to form a (R,G,B) panorama 818. Likewise, adjacent sets (inter-pair) of overlapping cylindrically warped (X,Y,Z) images can be stitched together to form a (X,Y,Z) panorama 816. Both (R,G,B) and (X,Y,Z) panoramas are then input to the graphics display system 808, such as the aforementioned VRML system, for visualization.

The present invention is preferably practiced in an image processing system including a source of digital images, such as a scanner; a computer programmed to process digital images; and an output device such as a graphics display device, a thermal printer, or an inkjet printer. The method of the present invention may be sold as a computer program product including a computer readable storage medium bearing computer code for implementing the steps of the invention. Computer readable storage medium may include, for example: magnetic storage media such as a magnetic disc (e.g. a hard disk or a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described with reference to a preferred embodiment. However, it will be appreciated that variations and modifications can be effected by a person of ordinary skill in the art without departing from the scope of the invention.

What is claimed is:

1. A method for deriving a three-dimensional panorama from a plurality of images of a scene generated from a range imaging camera of the type that produces ambiguities in range information, said method comprising the steps of:
    acquiring a plurality of images of the scene by rotating the camera about a Y-axis (vertical axis), wherein there is an inter-overlap region and known spatial relation between adjacent images and at least two of the adjacent images are range images, said range images each having relative scene spatial information, said range images differing by said known spatial relation and an unknown relative range difference;
    estimating said relative range difference to provide an estimate;
    automatically optimizing said estimate to provide an optimized constant range offset;
    automatically applying said constant range offset to one of said range images to provide corrected relative scene spatial information (X,Y,Z) of one of said range images with respect to a first local XYZ coordinate system and relative scene spatial information (X,Y,Z) of the other of said range images with respect to a second local XYZ coordinate system;
    selecting a reference three-dimensional world coordinate system against which spatial information of the scene can be correctly presented;
    transforming the corrected relative scene spatial information (X,Y,Z) from each of the local three-dimensional coordinate systems of each of the images to the selected reference three-dimensional world coordinate system, thereby providing transformed (X,Y,Z) images;
    warping the transformed (X,Y,Z) images onto a cylindrical surface, and forming a plurality of warped (X,Y,Z) images;
    registering adjacent warped (X,Y,Z) images; and
    forming a three-dimensional (X,Y,Z) panorama using the warped (X,Y,Z) images.

2. The method as claimed in claim 1 wherein the plurality of images generated from the range imaging camera includes color images and the three dimensional panorama is in color.

3. The method claimed in claim 1 wherein the reference three-dimensional world coordinate system is an arbitrary three-dimensional coordinate system.

4. The method claimed in claim 3 further comprising the step of selecting the reference three-dimensional world coordinate system from the local three-dimensional coordinate systems or a predefined three-dimensional coordinate system.

5. The method claimed in claim 1 wherein said step of transforming the corrected relative scene spatial information (X,Y,Z) comprises forming a homogeneous transformation matrix.

6. The method as claimed in claim 1 wherein each image is captured as a bundle of associated images, said bundle including a plurality of phase images each incorporating the effect of a predetermined modulation frequency together with a phase offset unique for each image.

7. The method as claimed in claim 6 wherein each range image is generated from a respective plurality of phase images associated with each bundle.

8. The method as claimed in claim 6 wherein the bundle also includes an intensity image.

9. The method as claimed in claim 8 wherein the intensity image is a color image.

10. A method for deriving a three-dimensional panorama from a plurality of images of a scene generated by a range imaging camera of the type that produces ambiguities in range information, said method comprising:
    acquiring a plurality of adjacent images of the scene, wherein there is an overlap region between the adjacent images and at least some of the adjacent images are range images;
    providing offset data for the range images in order to recover corrected relative scene spatial information, wherein the providing offset data includes:
        detecting a relative range difference between adjacent range images as a constant offset between the adjacent images by:
            predicting the relative range difference by an estimated constant offset;

warping the range images onto a cylindrical surface using the estimated constant offset, and forming a plurality of warped range images;

registering adjacent warped range images, thereby producing predicted range values;

evaluating any error between the predicted range values and the actual range values in the overlap region;

if the error is unacceptable, using an optimization routine to select another estimated constant offset; and repeating the warping, registering and evaluating until the error is acceptable, thereby producing the constant offset;

applying the constant offset to at least one of adjacent range images to correct for ambiguities in the relative ranges of the range images, thereby providing corrected range images; and deriving a three-dimensional panorama from the corrected range images.

11. The method as claimed in claim 2 wherein scene spatial information is provided as image values in a local three-dimensional coordinate system of each of the images and the step of deriving a three-dimensional panorama comprises the steps of:

(i) transforming the image values from each of the local three-dimensional coordinate systems of each of the images to a selected reference three-dimensional world coordinate system, thereby providing transformed range images;

(ii) warping the transformed range images onto a cylindrical surface, and forming a plurality of warped range images;

(iii) registering adjacent warped range images; and (iv) deriving the three-dimensional panorama using the warped range images.

12. A three-dimensional panoramic imaging system, comprising:

(a) a three-dimensional panoramic capturing system, wherein a sequence of image bundles are produced, each said image bundle having a plurality of phase images each having relative range values, each said image bundle having at least one intensity image, each said image bundle having a known capture position defining a known spatial relation between said images of adjacent said image bundles, said phase images of adjacent said image bundles also differing by an unknown relative range difference;

(b) a reference coordinate transformation system having an offset estimating component estimating a said relative range difference to provide an estimated constant offset between phase images of adjacent said image bundles, optimizing said estimated constant offset to provide an optimized constant offset, and applying said optimized constant offset to respective said image bundles to provide corresponding spatial images, and a general homogenous transformation matrix for transforming each of the spatial images into a common three-dimensional coordinate system based on said optimized constant offset;

(c) an image stitching system that produces a stitched spatial panorama from the transformed spatial images, and a stitched intensity panorama from the sequence of intensity images; and (d) a graphics display system for receiving the stitched spatial and intensity panoramas and generating a virtual world reality.

13. A computer program product for deriving a three-dimensional panorama from a plurality of images of a scene generated from a range imaging camera of the type that produces ambiguities in range information, said computer program product comprising: a computer readable storage medium having a computer program stored thereon for performing the steps of:

accessing a plurality of images of the scene by rotating the camera about a Y-axis (vertical axis), wherein there is an inter-overlap region and known spatial relation between adjacent images and at least two of the adjacent images are range images, said range images each having relative scene spatial information, said range images differing by said known spatial relation and an unknown relative range difference;

estimating said relative range difference to provide an estimate;

automatically optimizing said estimate to provide an optimized constant range offset;

automatically applying said constant range offset to one of said range images to provide corrected relative scene spatial information (X,Y,Z) of one of said range images with respect to a first local XYZ coordinate system and relative scene spatial information (X,Y,Z) of the other of said range images with respect to a second local XYZ coordinate system;

selecting a reference three-dimensional world coordinate system against which spatial information of the scene can be correctly presented;

transforming the corrected relative scene spatial information (X,Y,Z) from each of the local three-dimensional coordinate systems of each of the images to the selected reference three-dimensional world coordinate system, thereby providing transformed (X,Y,Z) images;

warping the transformed (X,Y,Z) images onto a cylindrical surface, and forming a plurality of warped (X,Y,Z) images;

registering adjacent warped (X,Y,Z) images; and forming a three-dimensional (X,Y,Z) panorama using the warped (X,Y,Z) images.

14. A computer program product as claimed in claim 13 wherein said step of transforming the generated (X,Y,Z) values comprises forming a homogeneous transformation matrix.

15. A method for deriving a three-dimensional panorama from a plurality of images of a scene generated by a range imaging camera of the type that produces ambiguities in range information, said method comprising the steps of:

acquiring a plurality of image bundles of the scene, said image bundles having capture positions differing by camera rotation about a Y-axis (vertical axis), wherein there is an inter-overlap region and known spatial relation between adjacent said image bundles, each said image bundle having an intensity image and three or more phase shift range images each having a different phase shift;

calculating range images from each of said image bundles, said range images each having three dimensional relative range values, adjacent said range images differing by a known spatial relation defined by respective said known capture positions and differing by an unknown relative range difference;

estimating said relative range difference between adjacent said range images to provide an estimated constant offset between the adjacent images;

automatically optimizing said estimated constant offset to provide an optimized constant offset; and deriving a three-dimensional panorama from said range images and said optimized constant offset.

16. The method as claimed in claim 15 wherein said optimizing further comprises:
warping said range images onto a cylindrical surface using said estimated constant offset to provide a plurality of warped range images;
registering adjacent said warped range images, thereby producing predicted range values;
evaluating any error between said predicted range values and actual said range values in said overlap region;
if said error is unacceptable, using an optimization routine to select another estimated constant offset; and
repeating said warping, registering, evaluating, and using until said error is acceptable, thereby producing said optimized constant offset.

17. The method of claim 15 wherein said estimating further comprises using said known spatial relation.

18. The method of claim 17 wherein said known spatial relation is an angular offset.

19. A method for deriving a three-dimensional panorama from a plurality of images of a scene generated from a range imaging camera of the type that produces ambiguities in range information, said method comprising the steps of:
acquiring a plurality of images of the scene by rotating the camera about a Y-axis (vertical axis), wherein there is an inter-overlap region and known spatial relation between adjacent images and at least two of the adjacent images are range images, said range images each having relative scene spatial information, said range images differing by said known spatial relation and an unknown relative range difference;
estimating said relative range difference to provide an estimate;
automatically optimizing said estimate to provide an optimized constant range offset;
automatically applying said constant range offset to one of said range images to provide corrected relative scene spatial information (X,Y,Z) of one of said range images with respect to a first local XYZ coordinate system and relative scene spatial information (X,Y,Z) of the other of said range images with respect to a second local XYZ coordinate system;
selecting a reference three-dimensional world coordinate system against which spatial information of the scene can be correctly presented;
transforming the corrected relative scene spatial information (X,Y,Z) from each of the local three-dimensional coordinate systems of each of the images to the selected reference three-dimensional world coordinate system, thereby providing transformed (X,Y,Z) images.

20. A method for deriving a three-dimensional panorama from a plurality of images of a scene generated by a range imaging camera of the type that produces ambiguities in range information, said method comprising:
acquiring a plurality of adjacent images of the scene, wherein there is an overlap region between the adjacent images and at least some of the adjacent images are range images;
estimating a constant offset between adjacent range images;
warping the range images onto a cylindrical surface using the estimated constant offset, and forming a plurality of warped range images;
registering adjacent warped range images, thereby producing predicted range values;
evaluating any error between the predicted range values and the actual range values in the overlap region;
if the error is unacceptable, using an optimization routine to select another estimated constant offset;
repeating the warping, registering and evaluating until the error is acceptable, thereby producing the constant offset;
applying the constant offset to at least one of adjacent range images to correct for ambiguities in the relative ranges of the range images, thereby providing corrected range images; and
deriving a three-dimensional panorama from the corrected range images.

21. A computer program product for deriving a three-dimensional panorama from a plurality of images of a scene generated from a range imaging camera of the type that produces ambiguities in range information, said computer program product comprising: a computer readable storage medium having a computer program stored thereon for performing the steps of:
acquiring a plurality of image bundles of the scene, said image bundles having capture positions differing by camera rotation about a Y-axis (vertical axis), wherein there is an inter-overlap region and known spatial relation between adjacent said image bundles, each said image bundle having an intensity image and three or more phase shift range images each having a different phase shift;
calculating range images from each of said image bundles, said range images each having three dimensional relative range values, adjacent said range images differing by a known spatial relation defined by respective said known capture positions and differing by an unknown relative range difference;
estimating said relative range difference between adjacent said range images to provide an estimated constant offset between the adjacent images;
automatically optimizing said estimated constant offset to provide an optimized constant offset; and
deriving a three-dimensional panorama from said range images and said optimized constant offset.

* * * * *

UNITED STATES PATENT AND TRADEMARK OFFICE
CERTIFICATE OF CORRECTION

PATENT NO. : 7,194,112 B2
APPLICATION NO. : 09/803802
DATED : March 20, 2007
INVENTOR(S) : Shoupu Chen et al.

It is certified that error appears in the above-identified patent and that said Letters Patent is hereby corrected as shown below:

Claim 11, Column 15, Line 20    In Claim 11, delete "claim 2" and insert -- claim 10 --

Claim 12, Column 15, Line 50    In Claim 12, before "said" delete "a".

Signed and Sealed this

Twentieth Day of November, 2007

JON W. DUDAS
*Director of the United States Patent and Trademark Office*